(12) United States Patent
Gasser et al.

(10) Patent No.: US 10,359,013 B2
(45) Date of Patent: Jul. 23, 2019

(54) VEHICLE SILENCER

(71) Applicant: Henn GmbH & Co KG., Dornbirn (AT)

(72) Inventors: Hans Gasser, Lauterach (AT); Harald Hartmann, Dornbirn (AT)

(73) Assignee: Henn GmbH & Co KG., Dornbirn (AT)

( * ) Notice: Subject to any disclaimer, the term of this patent is extended or adjusted under 35 U.S.C. 154(b) by 144 days.

(21) Appl. No.: 15/542,503

(22) PCT Filed: Jan. 12, 2016

(86) PCT No.: PCT/AT2016/050003
§ 371 (c)(1),
(2) Date: Jul. 10, 2017

(87) PCT Pub. No.: WO2016/112419
PCT Pub. Date: Jul. 21, 2016

(65) Prior Publication Data
US 2018/0266373 A1    Sep. 20, 2018

(30) Foreign Application Priority Data
Jan. 12, 2015  (AT) .............................. A 50018/2015

(51) Int. Cl.
*F02M 35/12* (2006.01)
*F02C 7/24* (2006.01)
(Continued)

(52) U.S. Cl.
CPC ........... *F02M 35/1266* (2013.01); *F02C 7/24* (2013.01); *F02M 35/1283* (2013.01);
(Continued)

(58) Field of Classification Search
CPC ........... F02M 35/1036; F02M 35/1266; F02M 35/1283; F02M 35/1211; F01N 13/1888; F01N 1/026
(Continued)

(56) References Cited

U.S. PATENT DOCUMENTS 4,244,442 A * 1/1981 Scarton .................. F01N 1/003
                                                181/230
4,327,817 A * 5/1982 Scarton .................. F01N 1/003
                                                181/296
(Continued)

FOREIGN PATENT DOCUMENTS

DE    10 2005 005865 A1    8/2006
DE    10 2008 005458 A1    7/2009
(Continued)

OTHER PUBLICATIONS

International Search Report of PCT/AT2016/050003, dated Apr. 26, 2016.

*Primary Examiner* — Jeremy A Luks
(74) *Attorney, Agent, or Firm* — Collard & Roe, P.C.

(57) ABSTRACT

The invention relates to a vehicle silencer (1). The vehicle silencer (1) comprises a first housing part (2) having a first outer casing (10) and a second housing part (3) having a second outer casing (21). The vehicle silencer (1) also comprises a resonator inner element (31) that is interlockingly accommodated in at least one of the housing parts (2, 3), and at least one chamber dividing wall (17), as well as at least one first inner pipe section (15) connecting to an inner perimeter (51) of the chamber dividing wall (17), wherein at least one first (6) and a second resonator chamber (7) are formed by the two housing parts (2, 3) and the resonator inner element (31). The resonator element (31) has at least one first outer pipe section (42) connecting to an outer perimeter (37) of the chamber dividing wall (17), said pipe (Continued)

section being formed coaxially to the first inner pipe section (15) of the resonator inner element (31), wherein an annulus (44) is formed between the outer pipe section (42) and the first outer casing (10) and/or the second outer casing (21).

10 Claims, 3 Drawing Sheets

(51) Int. Cl.
    *F16L 55/033*     (2006.01)
    *F04D 29/66*     (2006.01)
    *G10K 11/172*     (2006.01)
    *F02B 33/44*     (2006.01)

(52) U.S. Cl.
    CPC .......... *F04D 29/665* (2013.01); *F16L 55/033* (2013.01); *G10K 11/172* (2013.01); *F02B 33/44* (2013.01); *F05D 2220/40* (2013.01)

(58) Field of Classification Search
    USPC ................ 181/229, 250, 251, 266, 273, 276
    See application file for complete search history.

(56) References Cited

U.S. PATENT DOCUMENTS

| | | | |
|---|---|---|---|
| 4,874,062 A * | 10/1989 | Yanagida | F01N 1/02 181/250 |
| 5,208,429 A * | 5/1993 | Field | F02M 35/1222 181/229 |
| 6,681,888 B2 * | 1/2004 | Lepoutre | F02M 35/1261 181/249 |
| 9,309,843 B2 * | 4/2016 | Hwang | F02M 35/1255 |
| 10,030,660 B1 * | 7/2018 | Mehta | F04C 29/065 |
| 2003/0085071 A1 * | 5/2003 | Boast | F01N 1/003 181/249 |
| 2007/0107982 A1 * | 5/2007 | Sullivan | F01N 1/06 181/249 |
| 2007/0284178 A1 | 12/2007 | Scanlon | |
| 2011/0073406 A1 * | 3/2011 | Ortman | F02B 33/44 181/276 |
| 2012/0090915 A1 * | 4/2012 | Cheung | F02M 35/1216 181/224 |
| 2014/0116801 A1 * | 5/2014 | Andre | F01N 1/089 181/213 |
| 2014/0196977 A1 * | 7/2014 | Hartmann | F02M 35/1283 181/227 |
| 2017/0316771 A1 * | 11/2017 | Denker | F02M 35/1266 |
| 2018/0223779 A1 * | 8/2018 | Buck | F02M 35/1266 |

FOREIGN PATENT DOCUMENTS

| | | |
|---|---|---|
| DE | 10 2008 032491 A1 | 1/2010 |
| DE | 10 2011 108059 A1 | 1/2013 |
| EP | 1 865 188 A1 | 12/2007 |
| FR | 2 946 120 A1 | 12/2010 |
| JP | 2000 045782 A | 2/2000 |

\* cited by examiner

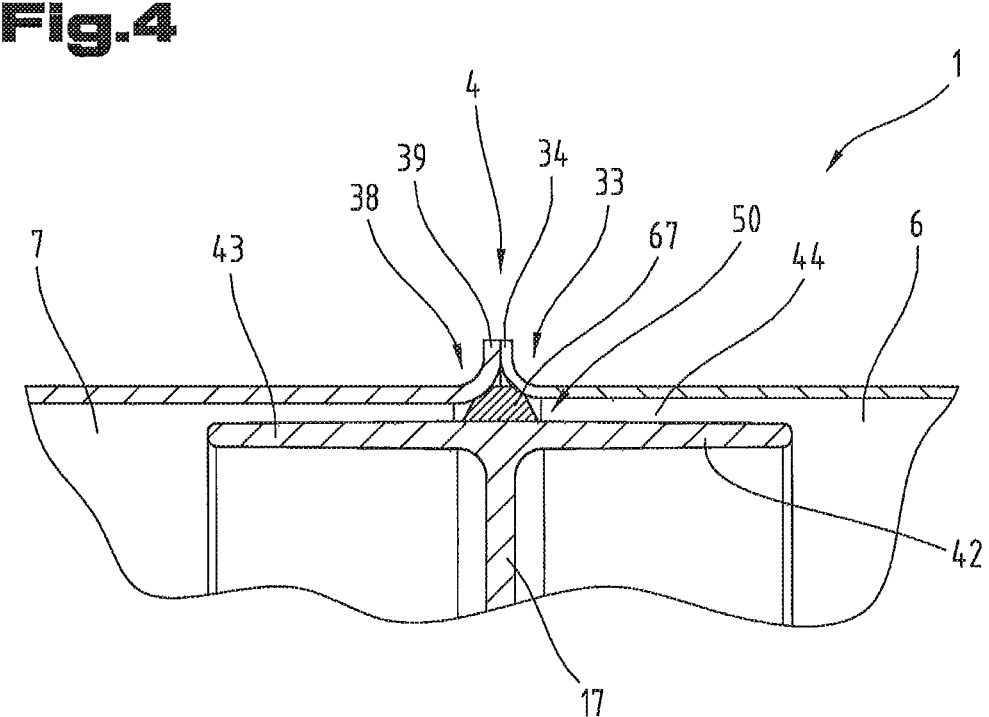
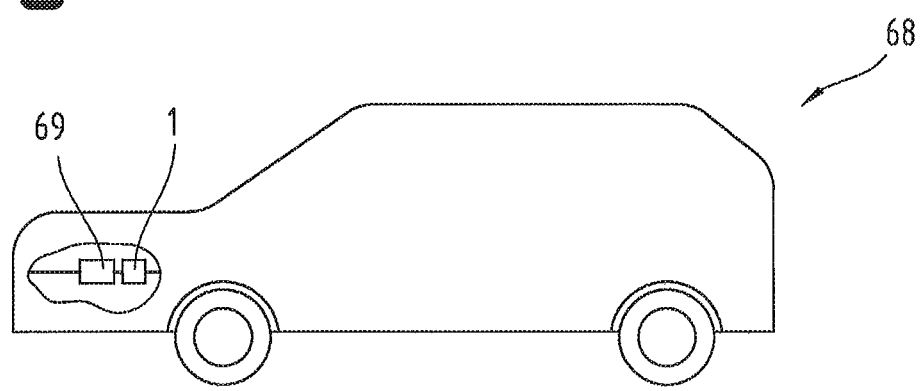

VEHICLE SILENCER

CROSS REFERENCE TO RELATED APPLICATIONS

This application is the National Stage of PCT/AT2016/050003 filed on Jan. 12, 2016, which claims priority under 35 U.S.C. § 119 of Austrian Application No. A 50018/2015 filed on Jan. 12, 2015, the disclosure of which is incorporated by reference. The international application under PCT article 21(2) was not published in English.

The invention relates to a vehicle silencer for a supercharger duct of a combustion engine with a turbocharger.

DE10 2005 005 865 A1 discloses a vehicle silencer with a resonator inner element, which together with the outer casing of the vehicle silencer forms two resonator chambers.

The underlying objective of the present invention is to create an improved vehicle silencer, which despite having the simplest possible structure has a high degree of functionality and efficiency.

The objective of the invention is achieved by a vehicle silencer described herein.

According to the invention a vehicle silencer for a supercharger duct of a combustion engine is designed with a turbocharger. The vehicle silencer comprises at least a first housing part with a first outer casing and a second housing part with a second outer casing, which housing parts are coupled together in a connecting area and form an outer casing of the vehicle silencer. The vehicle silencer also comprises a resonator inner element, which is mounted in a form-fitting manner in at least one of the housing parts and comprises at least one chamber dividing wall, and has at least one first inner pipe section adjoining an inner perimeter of the chamber dividing wall. At least a first and a second resonator chamber are formed by the two housing parts and the resonator inner element. The resonator inner element comprises at least one first outer pipe section adjoining an outer perimeter of the chamber dividing wall, which outer pipe section is designed to be coaxial to the first inner pipe section of the resonator inner element, wherein an annulus is formed between the outer pipe section and the first outer casing and/or the second outer casing.

An advantage of the design of the vehicle silencer according to the invention is that an additional frequency spectrum can be damped by the annulus. This is achieved in that pressure waves in the first or second resonator chamber can be transmitted through the annulus. As the annulus is formed by the first and the second outer pipe section of the resonator inner element, the vehicle silencer can be designed as simply as possible in order to achieve a high degree of effectiveness of the vehicle silencer.

Furthermore, it can be advantageous if the first and the second housing part are made from a metal material. It is an advantage here that the two housing parts are designed to be robust and also insensitive to temperature. Furthermore, the mass production of such metal housing parts is possible in a simple and inexpensive manner.

Furthermore, it is possible for the resonator inner element to be made from a plastic material. It is an advantage in this case that the resonator inner element, made as a plastic part has a low density and thus the total mass of the vehicle silencer can be kept as low as possible. Furthermore, a resonator inner element in the form of a plastic part has excellent vibrational properties, in order to be used in a vehicle silencer. A further advantage of a plastic part is that the latter can be produced by injection molding and thus also complex forms can be produced easily.

Furthermore, it is possible that a second inner pipe section adjoins the chamber dividing wall on the resonator inner element opposite the first inner pipe section. It is an advantage in this case that in this way the first or second resonator chamber can be designed according to the requirements for sound damping.

A design is also advantageous according to which a second outer pipe section adjoins the chamber dividing wall on the resonator inner element opposite the first outer pipe section. In particular in this way, the length of the annulus can be varied, whereby the frequency spectrum damped in the annulus can be adjusted.

According to one development it is possible that the resonator inner element can be fixed in position by a positioning element in the form of a first web and a second web. It is an advantage in this case that the resonator inner element can thereby be mounted easily in the two housing parts, whereby it is possible to ensure the most exact positioning of the resonator inner element.

Furthermore, it can be advantageous if a gap width of the annulus relative to the length of the annulus is between 0.5% and 20%, in particular between 1.5% and 10%, preferably between 2.5% and 3.5%. Mainly by means of these dimensions the sound damping behavior is improved by the annulus.

It is also possible for the length of the annulus to be between 5 mm and 80 mm, in particular between 10 mm and 50 mm, preferably between 15 mm and 25 mm. The sound damping behavior is improved by the annulus mainly by having said dimensions.

Furthermore, it is possible for the gap width of the annulus relative to a wall thickness of the outer pipe section to be between 20% and 200%, in particular between 50% and 150%, preferably between 80% and 100%. The sound damping behavior is improved by the annulus mainly by having said dimensions.

In particular, it can be advantageous if the first and second housing part are designed as a sheet metal formed part. Sheet metal formed parts are particularly inexpensive in mass production and can be produced with a high degree of repeat accuracy, so that the vehicle silencers produced in this way have a high degree of measurement accuracy.

For a better understanding of the invention the latter is explained in more detail with reference to the following Figures.

In a much simplified, schematic view:

FIG. 4 shows a detailed view of the annulus from the cross-sectional view according to FIG. 2;

FIG. 5 shows a schematic view of a motor vehicle comprising a vehicle silencer connected to the turbocharger.

Figure 1:
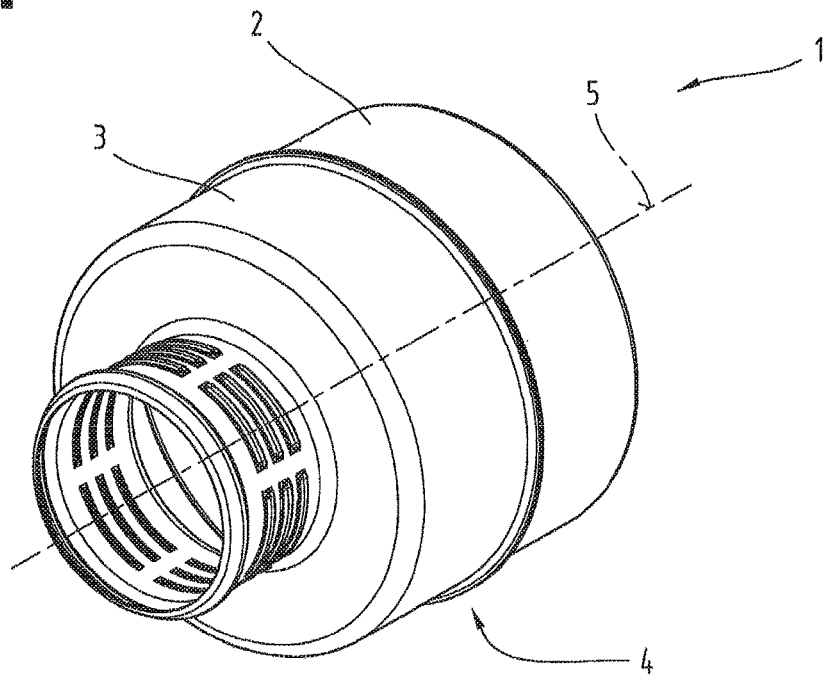
FIG. 1 shows a perspective view of a vehicle silencer.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows an isometric view of the vehicle silencer 1. The vehicle silencer 1 shown in this view comprises a first housing part 2 and a second housing part 3, which are connected together in a joining or connecting area 4. The vehicle silencer 1 is designed in this example embodiment as a rotationally symmetrical hollow body and therefore has a central axis 5. However, the embodiment according to the invention and described in more detail in the following is not limited to a rotationally symmetrical hollow body, but it is also possible for the vehicle silencer 1 to have an approximately rectangular or polygonal cross-section. In particular, it is possible for the hollow body to have a prismatic basic shape, i.e. with partially provided flat parts on its casing surface.

Figure 2:
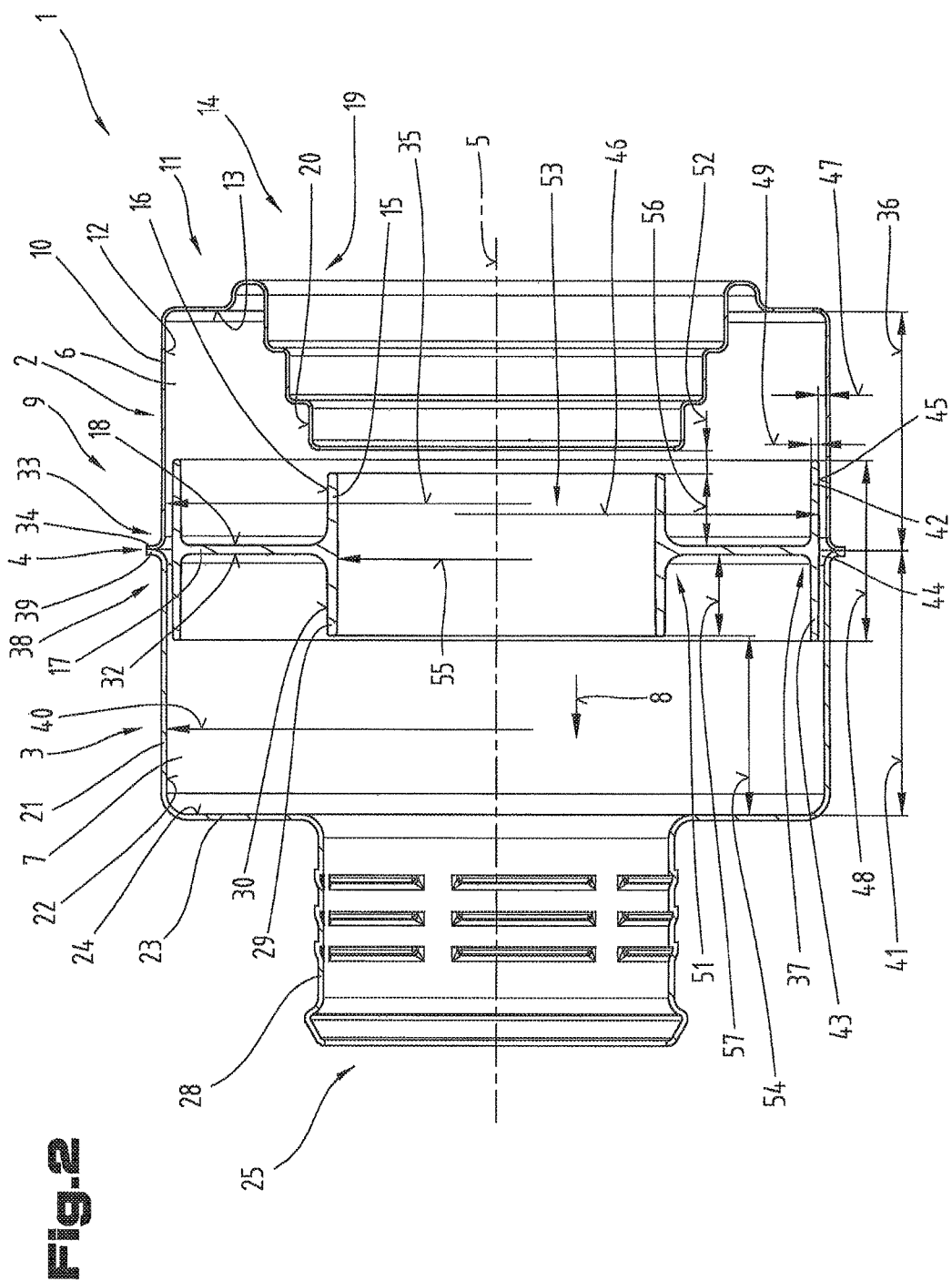
FIG. 2 shows a cross-sectional view of a vehicle silencer in a section along its central line.

FIG. 2 shows a cross-section of a first example embodiment of a vehicle silencer 1 along its central axis 5. The vehicle silencer 1 shown here comprises a first resonator chamber 6 and a second resonator chamber 7. With regard to the throughflow direction 8 for the gaseous medium, in particular for the charging air or combustion air, the first resonator chamber 6 is arranged in front of the second resonator chamber 7. The two housing parts 2, 3 form the aforementioned hollow body, in particular an outer casing 9 of the vehicle silencer 1. The first resonator chamber 6 is delimited externally by a first outer casing 10 and a first end face wall 11. The first end face wall 11 can be designed either as a flat wall or, as shown in FIG. 2, as a wall with graduations.

The first outer casing 10 and the first end face wall 11 are hereby included in the first housing part 2. More precisely the first resonator chamber 6 is delimited in its outer area by an inner casing surface 12 of the first outer casing 10 and by an end inner surface 13 of the first end face wall 11.

The first end face wall 11 comprises an inflow opening 14, through which the medium, in particular the compressed suction air, can flow into the first resonator chamber 6. The first resonator chamber 6 is delimited on the inside partially by a first inner pipe section 15 of a resonator inner element 31, or by an outer casing surface 16 of the first inner pipe section 15 and by a chamber dividing wall 17 of the resonator inner element 31 or a first wall surface 18 of the chamber dividing wall 17.

Furthermore, it is possible for the inflow opening 14 to comprise a step 19 designed to taper step-like in axial cross-section for mounting a coupling element. In this case the step-like tapering step 19 can be designed to protrude or project into the first resonator chamber 6 so that the latter delimits the first resonator chamber 6. In particular, it is possible that the outer casing surface 20 of the step-like tapering step 19 delimits the first resonator chamber 6.

In addition, in a similar way the second resonator chamber 7 can be delimited in its outer area by the second housing part 3. The second housing part 3 can thus have a second outer casing 21 with a second inner casing surface 22. Furthermore, it is possible for the second housing part 3 to have a second end face wall 23, wherein the second resonator chamber 7 is delimited by a second end face inner surface 24 of the second end face wall 23. The second housing part 3 also has on its second end face wall 23 an outflow opening 25 through which the gaseous medium can be guided. In this example embodiment shown in FIG. 2 the second end face wall 23 runs radially from the second outer casing 21 in the direction of the center. The second end face wall 23 is therefore arranged at a right angle to the second outer casing 21. However, in further example embodiments the second end face wall 23 can have a different design.

The first housing part 2 is thus arranged on the inflow side 26 and the second housing part 3 is arranged on the outflow side 27 of the resonator or the vehicle silencer 1. Furthermore, it is possible that a connecting point 28 is coupled to the outflow opening 25, which is provided for connecting a pressure hose. The connecting point 28 can be designed to be in one piece with the second housing part 3, as shown in FIG. 2. In an alternative variant it is also possible for the connecting point 28 to be designed as an independent component, which is connected for example by a welding connection to the second housing part 3. Furthermore, it is possible that the connecting point 28 is not connected directly to the second housing part 3 but that other housing parts are formed on the vehicle silencer 1.

On the inside the second resonator chamber 7 is delimited by a second, inner pipe section 29 of the resonator inner element 31, in particular by an outer casing surface 30 of the second inner pipe section 29. Furthermore, the second resonator chamber 7 is delimited by the chamber dividing wall 17, in particular by a second wall surface 32, of the chamber dividing wall 17 relative to the first resonator chamber 6.

In the embodiment variant of the vehicle silencer 1 according to FIG. 2 the vehicle silencer 1, which has two resonator chambers 6, 7, comprises a first housing part 2, a second housing part 3 and the resonator inner element 31.

The first housing part 2 and the second housing part 3 are designed in an advantageous embodiment variant as deep-drawn parts. In particular, it is possible that the two housing parts 2, 3 are shaped or deep-drawn from a metal material, such as steel sheet. Preferably, a stainless steel is used for this.

The resonator inner element 31 can be made from a plastic material and in particular designed as an injection molded part.

The individual components of the vehicle silencer 1 are designed so that the resonator inner element 31 is mounted in the first housing part 2 and/or in the second housing part 3 in a form-fitting manner. The vehicle silencer 1 can thereby have a material-bonded connection in the connecting area 4 in that the first housing part 2 and the second housing part 3 are connected in said joining or connecting area 4 by laser or plasma welding.

In the following part of the description the design of the individual parts is described which are included in the vehicle silencer 1. However, it should be noted that the design of said individual parts relates to an embodiment variant of the vehicle silencer 1. It is not absolutely necessary in the design according to the invention that all of the features described here are used or that the latter are designed as described here.

The first housing part 2 comprises in its connecting area 4 to the second housing part 3 a first connecting section 33. The first connecting section 33 comprises at its free end a radially outwardly protruding flange 34, by means of which the first housing part 2 is connected to the second housing part 3.

The connection between the first housing part 2 and second housing part 3 is preferably formed by a material-bonded connection, such as a welded connection, in particular a laser, plasma or microplasma welded connection.

The first outer casing 10 adjoins the first connecting section 33 on the inflow side 26. The first outer casing 10 has on its inner casing surface 12 a cross-sectional dimension 35. The first outer casing 10 has an axial extension 36.

The first end face wall 11 is designed adjoining the first outer casing 10, which end face wall comprises the inflow opening 14 and the step 19 designed to be step-like in axial cross-section for mounting a coupling element. The first end face wall 11 hereby adjoins the first outer casing 10 running in the direction of the center.

The second housing part 3 has a second connecting section 38, joined by the second outer casing 21. In particular, the area around the connecting section 38 of the second housing part 3 is designed to be similar to the first connecting section 33 of the first housing part 2. To avoid repetition a detailed description of the individual surfaces and positions is not provided again here.

Also a flange 39 adjoins the second connecting section 38, which is connected in the integrated state preferably by a welded connection to the flange 34 of the first connecting section 33. The second outer casing 21 has on its inner casing surface 22 a cross-sectional dimension 40. The cross-sectional dimension 40 of the second outer casing 21 and the cross-sectional dimension 35 of the first outer casing 10 are preferably the same size. The second outer casing 21 also has an axial extension 41.

The resonator inner element 31 comprises on the outer perimeter 37 of its chamber dividing wall 17 a first outer pipe section 42 and a second outer pipe section 43, which are opposite one another on the chamber dividing wall 17. As shown clearly in FIG. 2, the first outer pipe section 42 and the second outer pipe section 43 of the resonator inner element 31 are designed and dimensioned such that an annulus 44 is formed between the latter and the first outer casing 10 and/or the second outer casing 21. In particular, the annulus 44 extends between the inner casing surface 12 of the first outer casing 10 and an outer casing surface 45 of the outer pipe sections 42, 43.

The annulus 44 is formed in particular in that an outer diameter 46 of the first outer pipe section 42 and/or the second outer pipe section 43 is smaller than the cross-sectional dimension 35 of the inner casing surface 12 of the first outer casing 10 and the cross-sectional dimension 40 of the inner casing surface 22 of the second outer casing 21. By means of this difference between the cross-sectional dimensions a gap width 47 is formed which defines the size of the annulus 44.

The length 48 of the annulus 44 is formed by means of the longitudinal extension of the first outer pipe section 42 and the second outer pipe section 43.

The annulus 44 is used to form a flow-connection between the two resonator chambers 6, 7. In this way if there is a rise in pressure in the first resonator chamber 6 the pressure wave coming from the latter is damped in the annulus 44. In particular, an additional frequency can be damped by means of the annulus 44 in the vehicle silencer 1, whereby the damping properties of the vehicle silencer 1 can be improved.

The damping behavior of the vehicle silencer 1 is hereby heavily influenced by the gap width 47 and the length 48 of the annulus 44 or by their size ratio to one another. Furthermore, the damping behavior of the vehicle silencer 1 can be influenced by the wall thickness 49 of the outer pipe sections 42, 43.

The chamber dividing wall 17 is formed adjoining the outer pipe sections 42, 43 of the resonator inner element 31. The chamber dividing wall 17 thus extends in the direction of the center of the vehicle silencer 1. On the inner perimeter 51 of the chamber dividing wall 17 extending in radial direction the first inner pipe section 15 is formed on a first side. The first inner pipe section 15 is drawn hereby from the chamber dividing wall 17 in the direction of the inflow opening 14. On the opposite side of the chamber dividing wall 17 the second inner pipe section 29 is formed which runs or is drawn from the chamber dividing wall 17 in the direction of the outflow opening 25.

A first chamber gap 52 is formed by the first inner pipe section 15 and the first housing part 2, by which the first resonator chamber 6 is connected to a free throughflow opening 53 such that a gas exchange between the latter is possible. Similarly, by means of the second inner pipe section 29 and the second housing part 3 a second chamber gap 54 is formed by means of which the second resonator chamber 7 is connected to the free throughflow opening 53.

The first inner pipe section 15 and the second inner pipe section 29 preferably have the same common inner diameter 55. An axial extension 56 of the first inner pipe section 15 and an axial extension 57 of the second inner pipe section 29 depend on the axial extension 36 of the first outer casing 10 or on the axial extension 41 of the second outer casing 21. The chamber gaps 52, 54 can be defined by varying the axial extension 56 of the first inner pipe section 15 or the axial extension 57 of the second inner pipe section 29 and in this way the resonator behavior can be influenced.

Figure 3:
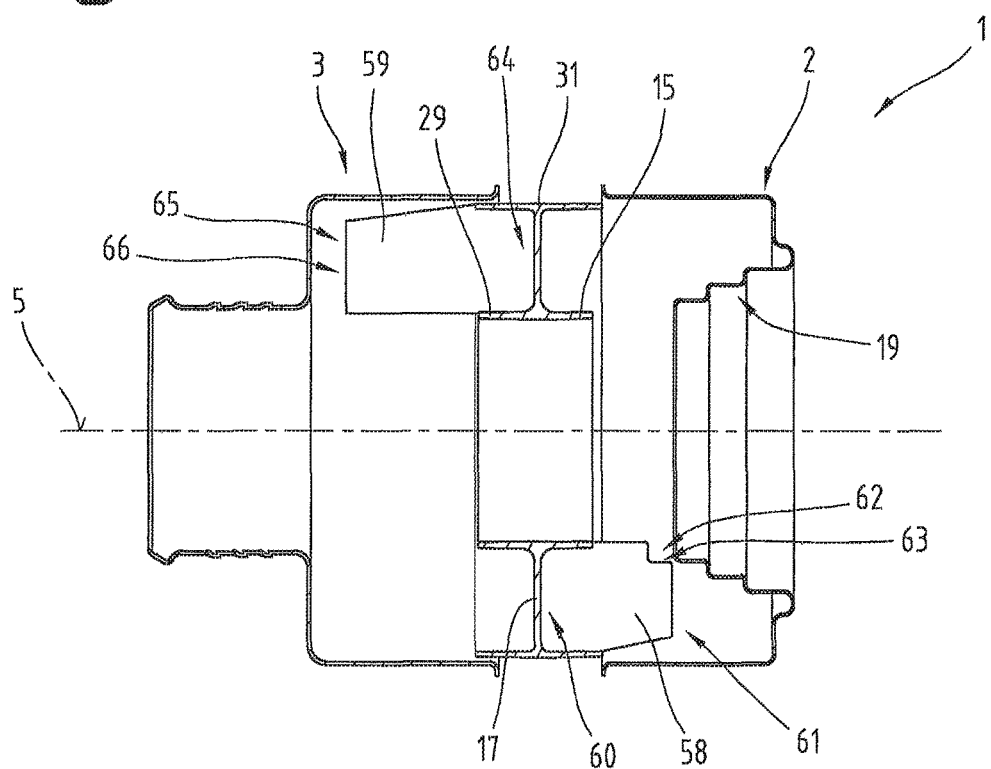
FIG. 3 shows an exploded view of a vehicle silencer in a cross-sectional representation comprising webs.

FIG. 3 shows a further and possible independent embodiment of the vehicle silencer 1, wherein the same reference numerals and component names have been used for the same part as in the preceding FIGS. 1 and 2. To avoid unnecessary repetition reference is made to the detailed description in the preceding FIGS. 1 and 2.

FIG. 3 shows an exploded view of the vehicle silencer 1. It is shown here clearly how the vehicle silencer 1 is made and assembled.

In particular, it can be seen in the example embodiment of the vehicle silencer 1 according to FIG. 3 that the resonator inner element 31 can comprise a positioning element 50, which is used for positioning the resonator inner element 31 inside the two housing parts 2, 3.

The positioning element 50 can comprise at least a first web 58, which is arranged on the outside of the first inner pipe section 15 and is connected to the latter. Preferably, three of these first webs 58 are arranged distributed evenly over the perimeter of the first inner pipe section 15, i.e. offset relative to one another by 120°. In this way it is possible to achieve a symmetrical stabilization of the first inner pipe section 15.

Furthermore, the resonator inner element 31 can comprise at least one second web 59, which is arranged on the outside of the second inner pipe section 29 and is connected to the latter. Preferably, three of said second webs 59 are distributed evenly over the perimeter of the second inner pipe section 29, i.e. offset relative to one another by 120°. In this way it is possible to achieve a symmetrical stabilization of the second inner pipe section 29.

Furthermore, it is possible that one of the first webs 58 can be arranged to be offset respectively relative to one of the second webs 59 by 60°.

As shown particularly clearly in FIG. 3, it is possible that a first web end face 60 of the first web 58 adjoins the chamber dividing wall 17 and a second web end face 61 of the first web 58 has a support section 62, which cooperates with the first housing part 2. In particular, it is possible that a graduation 63 is formed in the support section 62, which engages in the step 19 which is designed to taper in a step-like manner. By means of the interaction of the graduation 63 with the step 19 designed to taper in step-like manner it is possible that the resonator inner element 31 can be positioned axially relative to the two housing parts 2, 3. Furthermore, the resonator inner element 31 is positioned or fixed relative to an angled position of its central axis 5 relative to the angled position of the central axis 5 of the first 2 and second housing part 3. Preferably, the central axis 5 of the resonator inner element 31 and the central axis 5 of the outer casing 9 are positioned to be coaxial to one another.

In a similar way it is possible for a first web end face side 64 of the second web 59 to adjoin the chamber dividing wall 17 and for a second web end face side 65 of the second web 59 to also have a support section 66. Said support section 66 can cooperate with the second housing part 3. It is also possible for the first web 58 to project over the first inner pipe section 15 and/or for the second web 59 to project over the second inner pipe section 29. In particular it is possible that the first web 58 is arranged between the first inner pipe section 15 and first outer pipe section 42 and is connected to the chamber dividing wall 17. Furthermore, it is possible for the second web 59 to be arranged between the second inner pipe section 29 and second outer pipe section 43 and connected to the chamber dividing wall 17.

In the following a possible production process for producing an example embodiment of the vehicle silencer 1 shown in FIG. 3 is outlined in brief.

At the beginning of the production process it is possible for the first housing part 2 and the second housing part 3 to be deep-drawn so that they acquire their characteristic pot-like or dish-like form. The resonator inner element 31 can be formed by an injection molding process from plastic granulate. During the assembly of the vehicle silencer 1 either the first housing part 2 or the second housing part 3 can be used as the base, wherein the other parts are fitted or attached onto the latter. In this example embodiment the example of the assembly is described under the assumption that the second housing part 3 represents the base element.

The second housing part 3 is inserted into an assembly device in order to be secured there. Furthermore, it is also possible that the second housing part 3 is held by a manipulator, for example a robot.

In a further method step the resonator inner element 31 is inserted into the second connecting section 38 of the second housing part 3. The axial position of the resonator inner element 31 relative to the second housing part 3 can hereby be determined by the second web 59.

As already mentioned, it is not important how the resonator inner element 31 is oriented when inserted into the second housing part 3.

In a further method step the first housing part 2 is positioned relative to the second housing part 3.

The two housing parts 2, 3 are pushed onto one another or against one another so far until the flange 34 of the first connecting section 33 contacts the flange 39 of the second connecting section 38.

In a further method step the first housing part 2 can be connected to the second housing part 3. In particular, here the adjoining flanges 34, 39 are welded. The welding method used for industrial manufacturing, in particular mass production, is hereby preferably a laser or plasma welding process. However, it is also possible to use any other welding method which is suitable for connecting the two housing parts 2, 3 to one another in a material-bonded manner. The two flanges 34, 39 can be used to avoid burning through the thin sheet metal from which the housing parts 2, 3 are made and thus the welding connection of the two housing parts 2, 3 can have a high strength.

FIG. 4 shows a further and possibly independent embodiment of the vehicle silencer 1, wherein for the same parts the same reference numerals and component names have been used as in the preceding FIGS. 1 to 3. To avoid unnecessary repetition reference is made to the detailed description in the preceding FIGS. 1 to 3.

FIG. 4 shows a further example embodiment of the vehicle silencer 1 in a detailed view of a cross-section according to FIG. 2. In contrast to the example embodiment shown in the preceding FIG. 3 of the vehicle silencer 1, in this example embodiment the positioning element 50 is designed in the form of a positioning plug 67. It is essential in this case that the positioning plug 67 is designed as a segmental element as viewed over the perimeter in order to ensure a flow connection between the first 6 and second resonator chamber 7. In this case it is possible that a plurality of said positioning plugs 67 are arranged distributed around the perimeter in order to securely hold the resonator inner element 31 inside the housing parts 2, 3. In particular, it is possible that three of said positioning plugs 67 are arranged distributed evenly over the perimeter of the second inner pipe section 29, that is are offset relative to one another by 120°. In this way it is possible to achieve the symmetrical stabilising of the resonator inner element 31.

As shown in FIG. 4, it is possible that the positioning pin 67 is designed such that it can be mounted in the joined state of the two housing parts 2, 3 between the first connecting section 33 and second connecting section 38. The resonator inner element 31 can thus be positioned by joining the two housing parts 2, 3 relative to one another.

The positioning plug 67 can be designed for example in one piece with the resonator inner element 31. However, it is also possible that the positioning plug 67 is designed as a sprue which is fitted onto the resonator inner element 31.

FIG. 5 shows a vehicle 68 with a turbocharger 69 and a vehicle silencer 1 according to the invention which is connected on the pressure side of the turbocharger 69.

The turbocharger 69 is defined here as a compression device for the combustion air of the combustion engine of the vehicle 66. Instead of a turbocharger 69 it is also possible to use a compressor arrangement or other device increasing the charging pressure of the combustion air. The vehicle silencer 1 according to the invention thereby reduces or minimizes the flow sounds or the sound of whistling or vibration which occur during the operation of the combustion engine at least within a certain frequency range. By means of the described vehicle silencer 1 in this way it is possible to increase the level of comfort in a motor vehicle, the combustion engine of which is provided with the given vehicle silencer 1 on the charging pressure side.

The exemplary embodiments show possible embodiment variants of the vehicle silencer 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Furthermore, also individual features or combinations of features from the shown and described different example embodiments can represent in themselves independent solutions according to the invention.

The problem addressed by the independent solutions according to the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Mainly, the individual embodiment shown in FIGS. 1 to 4 can form the subject matter of independent solutions according to the invention. The problems and solutions relating to this according to the invention can be taken from the detailed descriptions of said Figures.

Finally, as a point of formality, it should be noted that for a better understanding of the structure of the vehicle silencer 1, the latter and its components have not been represented true to scale in part and/or have been enlarged and/or reduced in size.

LIST OF REFERENCE NUMERALS

| 1 | vehicle silencer |
|---|---|
| 2 | first housing part |
| 3 | second housing part |
| 4 | connecting area |
| 5 | central axis |
| 6 | first resonator chamber |
| 7 | second resonator chamber |
| 8 | throughflow direction |
| 9 | outer casing |
| 10 | first outer casing |
| 11 | first end face wall |
| 12 | first inner casing surface |
| 13 | end face inner surface |
| 14 | inflow opening |
| 15 | first inner pipe section |
| 16 | outer casing surface |
| 17 | chamber dividing wall |
| 18 | first wall surface |
| 19 | step |
| 20 | outer casing surface |
| 21 | second outer casing |
| 22 | second inner casing surface |
| 23 | second end face wall |
| 24 | second end face inner surface |
| 25 | outflow opening |
| 26 | inflow side |
| 27 | outflow side |
| 28 | connecting point |
| 29 | second inner pipe section |
| 30 | outer casing surface |
| 31 | resonator inner element |
| 32 | second wall surface |
| 33 | first connecting section |
| 34 | flange of first connecting section |
| 35 | cross-sectional dimension of first outer casing |
| 36 | axial extension of first outer casing |
| 37 | outer perimeter |
| 38 | second connecting section |
| 39 | flange of second connecting section |
| 40 | cross-sectional dimension of second outer casing |
| 41 | axial extension of second outer casing |
| 42 | first outer pipe section |
| 43 | second outer pipe section |
| 44 | annulus |
| 45 | outer casing surface outer pipe sections |
| 46 | outer diameter pipe section |
| 47 | gap width |
| 48 | length annulus |
| 49 | wall thickness of outer pipe section |
| 50 | positioning element |
| 51 | inner perimeter |
| 52 | first chamber gap |
| 53 | free throughflow opening |
| 54 | second chamber gap |
| 55 | inner diameter pipe sections |
| 56 | axial extension of first inner pipe section |
| 57 | axial extension of second inner pipe section |
| 58 | first web |
| 59 | second web |
| 60 | first web face side first web |
| 61 | second web face side first web |
| 62 | support section first web |
| 63 | graduation |
| 64 | first web end face side second web |
| 65 | second web end face side second web |
| 66 | support section second web |
| 67 | positioning plug |
| 68 | vehicle |
| 69 | turbocharger |

The invention claimed is:

1. A vehicle silencer for a supercharger duct of a combustion engine with a turbocharger, comprising:
at least a first housing part with a first outer casing and a second housing part with a second outer casing, which housing parts are coupled to one another in a connecting area and form an outer casing of the vehicle silencer, and
a resonator inner element, which is mounted in a form-fitting manner in at least one of the housing parts and comprises at least one chamber dividing wall, and at least one first inner pipe section adjoining an inner perimeter of the chamber dividing wall,
wherein at least one first and one second resonator chamber are formed by the two housing parts and the resonator inner element,
wherein the resonator inner element adjoining an outer perimeter of the chamber dividing wall comprises at least one first outer pipe section, which is designed to be coaxial to the first inner pipe section of the resonator inner element, and
wherein an annulus is formed between the outer pipe section and the first outer casing and/or the second outer casing.

2. The vehicle silencer as claimed in claim 1, wherein the first and the second housing part are made from a metal material.

3. The vehicle silencer as claimed in claim 1, wherein the resonator inner element is made from a plastic material.

4. The vehicle silencer as claimed in claim 1, wherein on the resonator inner element opposite the first inner pipe section a second inner pipe section adjoins the chamber dividing wall.

5. The vehicle silencer as claimed in claim 1, wherein on the resonator inner element opposite the first outer pipe section a second outer pipe section adjoins the chamber dividing wall.

6. The vehicle silencer as claimed in claim 1, wherein the resonator inner element can be fixed in position by a positioning element in the form of a first web and a second web.

7. The vehicle silencer as claimed in claim 1, wherein a gap width of the annulus relative to the length of the annulus is between 0.5% and 20%.

8. The vehicle silencer as claimed in claim 1, wherein the length of the annulus is between 5 mm and 80 mm.

9. The vehicle silencer as claimed in claim 1, wherein the gap width of the annulus relative to a wall thickness of the outer pipe section is between 20% and 200%.

10. The vehicle silencer as claimed in claim 1, wherein the first and the second housing part are designed as a sheet metal formed part.

* * * * *